United States Patent
Krajewski et al.

[15] 3,648,136
[45] Mar. 7, 1972

[54] TRANSDUCTION, CONTROL AND MEASUREMENT OF VIBRATION IN VIBRATORY APPARATUS

[72] Inventors: Werner Krajewski, Stoney Creek; John Nahirny, Hamilton, Ontario, both of Canada

[73] Assignee: Syntron (Canada) Limited, Stoney Creek, Ontario, Canada

[22] Filed: Oct. 27, 1969

[21] Appl. No.: 869,541

[30] Foreign Application Priority Data

Nov. 4, 1968 Canada...................................034253

[52] U.S. Cl..............................318/128, 318/132, 310/9.1
[51] Int. Cl.........................................................H02k 33/00
[58] Field of Search........................310/8, 8.1, 8.7, 9.1, 8.4; 318/116, 118, 120, 133; 307/309, 308

[56] References Cited

UNITED STATES PATENTS

| | | | |
|---|---|---|---|
| 2,322,217 | 6/1943 | Baird | 318/128 |
| 2,844,777 | 7/1958 | Ross | 318/128 |
| 3,045,476 | 7/1962 | Bell | 318/128 X |
| 3,122,690 | 2/1964 | Dion et al. | 318/128 |
| 3,331,239 | 7/1967 | Larsen et al. | 318/128 X |
| 3,405,288 | 10/1968 | Dittrich | 310/8.4 |
| 3,504,250 | 3/1970 | Stevens, Jr. et al. | 318/128 |
| 3,294,988 | 12/1966 | Packard | 310/8 |
| 3,470,395 | 9/1969 | Moffatt | 310/8.1 |
| 3,482,122 | 12/1969 | Lenahan | 310/8.1 X |

*Primary Examiner*—D. F. Duggan
*Attorney*—Westell and Hanley

[57] ABSTRACT

A method and apparatus for transducing the amplitude of vibration of a mechanical vibratory device into electrical energy, using a field effect transistor. Preferably an accelerometer is mounted on the device and oriented for relative oscillation in the direction of vibration.

3 Claims, 4 Drawing Figures

Patented March 7, 1972

INVENTORS
WERNER KRAJEWSKI
JOHN NAHIRNY
BY *Westell & Hanley*

INVENTORS
WERNER KRAJEWSKI
JOHN NAHIRNY
BY
Westell & Hanley

TRANSDUCTION, CONTROL AND MEASUREMENT OF VIBRATION IN VIBRATORY APPARATUS

The present invention relates to mechanical vibratory apparatus and more particularly to the transduction, control and measurement of the amplitude of vibration of such equipment.

Vibratory apparatus is used for example in the controlled movement of particulate material and the apparatus is viberated electromagnetically. To achieve a constant flow of the material it is necessary to control the amplitude of vibration of the apparatus but this is difficult because the material being moved has a dampening effect and any change in density of the material affects its rate of flow. Variations in line voltage also affect the amplitude of vibration of the apparatus and consequently the flow rate of the material.

To overcome this problem a mechanical-electrical transducer has been used to sense the amplitude of vibration of vibratory apparatus. This transducer consists of an adjustable reed turned to the frequency of the vibratory apparatus and having a permanent magnet fixed at its free end which is positioned over a pickup coil, the transducer being mounted on the trough of the apparatus. The magnet induces a signal in the coil when the reed is vibrated, and the variations in the induced electrical signal, caused by variations in the amplitude of vibration of the apparatus and hence of the reed, are used to control the line voltage to the vibrator. Such a device is cumbersome and not adaptable for use with small feeders; it gives an output approximately proportional to the amplitude of vibration of the feeder only over a limited amplitude range because of factors such as inertia; and it has only a narrow frequency response.

It is an object of the invention to provide an apparatus for controlling the amplitude of vibration of vibratory equipment, which produces a control signal proportional to the amplitude of vibration of the equipment over an extended frequency range.

Another object of the invention is to provide a unit of the above-mentioned type which is adaptable to measure the amplitude at any given time.

It is a further object of the present invention to provide a method and apparatus, for controlling the amplitude of vibration of vibratory equipment, which is compact, rugged and reliable.

Still another object of the invention is to provide an apparatus, for controlling the amplitude of vibration of vibratory equipment, which has a low output impedance.

Example embodiments of the invention are shown in the accompanying drawings in which.

Figure 1:
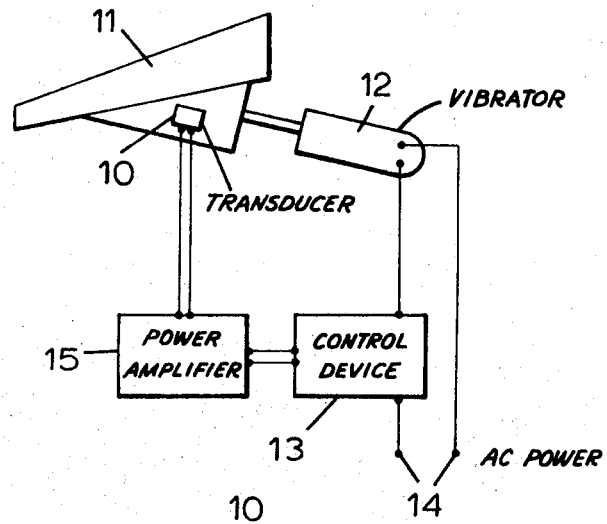
FIG. 1 is a schematic diagram of an amplitude control device, shown in association with a vibratory feeding apparatus.

As shown in FIG. 1 of the drawings, the invention consists of a mechanical-electrical transducer 10 which is fixed to a vibratory feeding trough 11 driven by an electromagnetic vibrator 12 connected through a control device 13 to a power source 14. The output of transducer 10 is connected to the input of a power amplifier 15 whose output is in turn connected to a terminal on control device 13.

Figure 2:
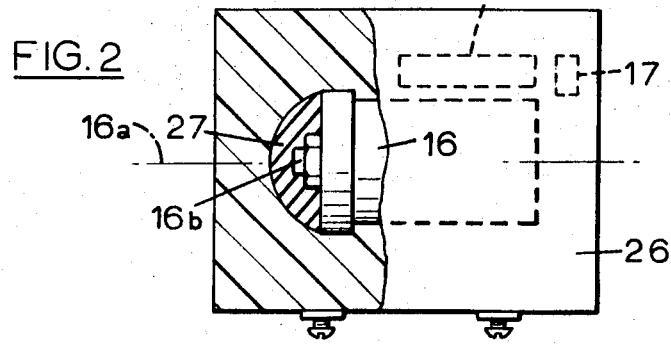
FIG. 2 is a plan view showing the encapsulated transducer unit of FIG. 1.

Transducer 10 is shown more particularly in FIG. 2 of the drawings and consists essentially of a mechanical-electrical vibration transducer, in the form of an accelerometer 16, connected with a field effect transistor 17 such as an N-type junction field effect transistor. An accelerometer suitable for the purpose is a piezo-electric accelerometer sold by Cosmocord under the trademark ACOS 1D1001, which will operate at accelerations as high as 1,000 g's and frequencies between 50 and 10,000 Hz., with output potential proportional to acceleration. Such an accelerometer has a vibratory axis 16a coincident with the longitudinal axis of an oscillatory mounting shaft 16b. It will be appreciated that any transducer may be used which will produce an electrical potential varying as the acceleration of vibration trough 11. Such a potential will not only reflect the amplitude of the vibratory device but also its frequency of vibration.

The output of accelerometer 16 is connected in series between terminal 18 and gate 19 of transistor 17, and a load resistor 20 is connected in parallel with accelerometer 16. A condenser 21 and a resistor 22, in parallel, are connected between emitter 23 of transistor 17 and terminal 18 to provide gate bias in the source circuit of the transistor. Collector 24 of transistor 17 is connected to a terminal 25.

As shown in FIG. 2 of the drawings, the entire solid-state unit comprising transducer 10 of FIG. 1 is encapsulated in a block 26 of suitable material such as epoxy resin which enables the unit to be mounted on vibratory apparatus 11. To prevent interference with the operation of accelerometer 16, the projection of shaft 16b at one end of the accelerometer is capped with a suitable resilient material 27, such as silicone rubber, before encapsulation in the epoxy resin. Accelerometer 16 must be mounted with its vibratory axis 16a, i.e. the line on which it oscillates longitudinally, parallel to the axis of vibration of the apparatus to which it is attached.

Figure 3:
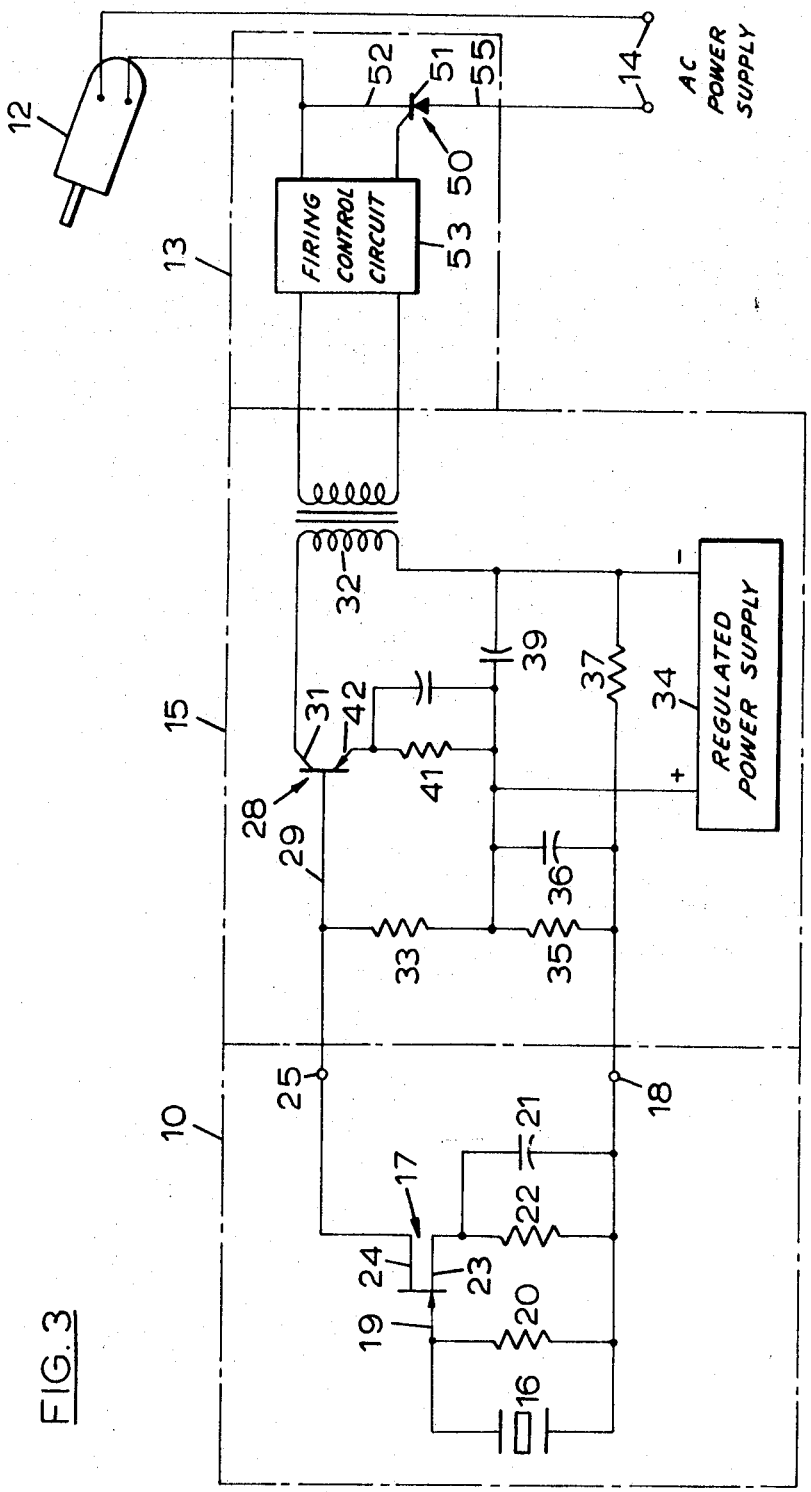
FIG. 3 is a schematic wiring diagram of the transducer amplification, and control units of the device of FIG. 1.

As seen in FIG. 3 of the drawings, power amplifier 15 consists of a PNP-transistor 28 having its base 29 connected with terminal 25 and its collector 31 connected with one terminal of the primary winding of an impedance matching output transformer 32. Terminal 18 also connects through a load resistor 33 with the positive terminal of a direct-current-regulated power supply 34. Resistor 33 provides an external load for field effect transistor 17 and bias for PNP-transistor 28. The positive terminal of power supply 34 is connected in series through a resistor 35, in parallel with a filtering condenser 36, and then through a resistor 37 in series to the negative terminal of the power supply. Resistors 35 and 37 form a voltage divider to provide 15 volts DC to transducer 10 (the preamplifier). Terminal 18 is also connected in series through resistor 37 with the negative terminal of power supply 34. The second terminal of the primary winding of transformer 32 is connected with the negative terminal of power supply 34 which is connected with its positive terminal through a filtering condenser 39. A filtering condenser 40 and a resistor 41, in parallel, are connected between emitter 42 of PNP-transistor 28 and the positive terminal of DC-power supply 34. Resistor 41 acts as a thermal drift compensator.

Control device 13, shown in detail in FIG. 3 of the drawings, consists of a silicon-controlled rectifier 50 having its gate terminal 51 and its cathode terminal 52 connected to a firing control circuit 53 which is in turn connected with the secondary winding of transformer 32. A firing control circuit 53 suitable for the purpose is manufactured and sold by Syntron (Canada) Limited under the designation FCC No. CA-6142. The emitter 55 of silicon-controlled rectifier 50 is connected with a suitable alternating-current power source 14 while the collector of the silicon-controlled rectifier is connected with vibrator 12 which in turn is connected with the AC-power source to form a circuit having the rectifier and vibrator in series.

With circuitry connected as shown in FIG. 3 of the drawings, transducer 10 is fixed to vibratory feeding trough 11 with the vibratory axis 16a of accelerometer 16 parallel to the axis of vibration of the trough. Transducer 10 is then connected with power amplifier 15 and control device 13 through terminals 18 and 25. As accelerometer 16 oscillates in conjunction with feeding trough 11, it varies the potential at gate 19 of field effect transistor 17, thus varying the amount of current passing from emitter 23 to collector 24 of the field effect transistor. The consequently varying potential drop across resistor 33 varies the emitter-base bias of PNP-transistor 28 which in turn varies the current passing from emitter 42 to collector 31 and thence to output transformer 32. The alternating-current output from transformer 32 is rectified by firing control circuit 53 in control device 13 to provide a trigger signal which is applied to silicon-controlled rectifier 50 between its gate 51 and its cathode 52. The firing of silicon-controlled rectifier 50 is retarded in proportion to the signal received by firing control circuit 53 which is in turn proportional to the feedback signal from transducer 10. In this manner silicon-controlled rectifier 50, which is connected in series with the drive coil of electromagnetic vibrator 12, controls the energy from power source 14 supplied to vibrator 12 as determined by the length of time the rectifier is allowed to conduct during any one-half cycle of the alternating-current power source.

Thus an increase in amplitude of the oscillation of vibratory feeder 11, driven by vibrator 12, will increase the oscillation of accelerometer 16, providing an increased potential swing at gate 19 of field effect transistor 17. The increased variable current flow through transistor 17 is delivered through PNP-transistor 28 and transformer 32 to firing control circuit 53 which increases the retardation of the firing of silicon-controlled rectifier 46 in relation to the passing one-half cycle of current from power source 14. This provides less energy to vibrator 12 and the amplitude of vibration of trough 11 is correspondingly reduced. Conversely a decrease in amplitude of trough 11 lessens the retardation of firing of silicon-controlled rectifier 50 and increases the power supply from source 11 to vibrator 12. Hence the amplitude of vibration of trough 11 may be limited to a variation within relatively narrow limits.

Figure 4:
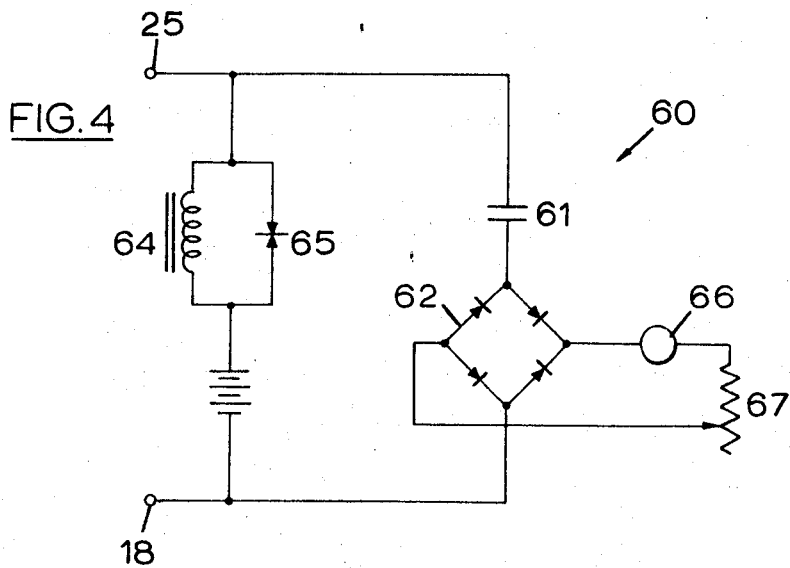
FIG. 4 is a schematic wiring diagram of a device modifying the circuit of FIG. 3 to provide amplitude measurement.

If it is desired to measure the amplitude of vibration of trough 11 rather than to control it the embodiment shown in FIG. 4 is used. Amplifier 15 is disconnected from terminals 25 and 18 of transducer 10 and terminal 25 of the transducer is connected through a capacitor 61 to one input terminal of a rectifier bridge 62 whose other input terminal is connected to terminal 18 of the transducer. The negative terminal of a direct-current power source 63 is also connected to terminal 18 while the positive terminal of power source 63 is connected through a load impedance 64 to terminal 25 of the transducer. A selenium surge suppressor 65 having a threshold voltage is connected in parallel across load impedance 64 to absorb current and reduce the inductive kick across the low impedance when connecting or disconnecting the unit with transducer 10. The output terminals of bridge 62 are connected across a readout meter 66 and a variable resistor 67 in series.

In the operation of measuring device 60 the alternating-current signal from field effect transistor 17 of transducer 10 is full-wave rectified by bridge 62 and applied to readout meter 66. Variable resistor 67 provides adjustment for meter 66.

I claim:

1. Apparatus for controlling the amplitude of vibration of an electrically driven mechanical vibratory device;

a field effect transistor;

an accelerometer adapted to be mounted and oriented on the device to produce a first electrical potential varying as the acceleration in the direction of vibration of the device, the accelerometer being connected to apply the electrical output of the potential thereof between the gate and the emitter of the field effect transistor;

means for applying a second potential between the collector and the emitter of the field effect transistor, of a magnitude to maintain conduction therein for the range of said output;

means for producing a third potential proportional to the collector-emitter current flow through the field effect transistor;

means for amplifying the electrical output of the third potential producing means; and means inversely responsive to the amplitude of the alternating-current component of the third potential for controlling the current applied to drive the device, in which the accelerometer includes an oscillatory mounting shaft and is encapsulated for mounting on the device, the mounting shaft being encased in resilient material.

2. Apparatus as claimed in claim 1 in which the accelerometer is encapsulated in epoxy resin and the vibratory shaft of the accelerometer is encased in silicone rubber.

3. An apparatus as claimed in claim 1 in which the transistor is encapsulated together with the accelerometer.

* * * * *